United States Patent [19]
Akagi

[11] Patent Number: 5,492,778
[45] Date of Patent: Feb. 20, 1996

[54] FUEL CELL ASSEMBLY AND METHOD OF PRODUCING THE SAME

[75] Inventor: Kosuke Akagi, Ikoma, Japan

[73] Assignee: Osaka Gas Co., Ltd., Osaka, Japan

[21] Appl. No.: 184,300

[22] Filed: Jan. 21, 1994

[30] Foreign Application Priority Data

Feb. 1, 1993 [JP] Japan ................................ 5-014364

[51] Int. Cl.⁶ .................................................. H01M 8/10
[52] U.S. Cl. .............................. 429/34; 429/30; 429/33; 429/38; 429/39; 429/40; 429/44; 429/45
[58] Field of Search ............................. 429/33, 38, 39, 429/40, 26, 30, 34, 44, 45

[56] References Cited

FOREIGN PATENT DOCUMENTS

| | | |
|---|---|---|
| 0406523 | 1/1991 | European Pat. Off. . |
| 0524326 | 1/1993 | European Pat. Off. . |
| 4016157 | 12/1990 | Germany . |

*Primary Examiner*—Prince Willis, Jr.
*Assistant Examiner*—M. Nuzzolillo
*Attorney, Agent, or Firm*—Gifford, Krass, Groh, Sprinkle, Patmore, Anderson & Citkowski

[57] ABSTRACT

A fuel cell assembly includes a plurality of fuel cells. Each cell has a solid electrolyte plate, an oxygen electrode attached on one side of the electrolyte plate, a fuel electrode attached on the other side of the electrolyte plate and an electrically conductive flow-channel forming member disposed in opposition to the oxygen electrode for forming an oxygen-bearing gas channel or in opposition to the fuel electrode for forming a fuel gas channel. The fuel cells are stacked one on another with a predetermined space therebetween for forming the oxygen-bearing or fuel gas channel, in which an elastic electrically conductive member is provided for allowing electrical conduction as well as elasticity and gas permeability between the adjacently stacked fuel cells. An electrically conductive film element is interposed between the flow-channel forming member and the elastic conductive member, with film element being conductively affixed to the flow-channel forming member and being fused to the elastic conductive member.

18 Claims, 9 Drawing Sheets

FUEL CELL ASSEMBLY AND METHOD OF PRODUCING THE SAME

BACKGROUND OF THE INVENTION

1. Field of the Invention

The present invention relates to a fuel cell assembly and a method of producing the same, and more particularly to a fuel cell assembly including a plurality of fuel cells each having a solid electrolyte plate including an oxygen electrode on one side and a fuel electrode on the other side, an electrically conductive flow-channel forming member disposed in opposition to the oxygen electrode for forming an oxygen-bearing gas channel or in opposition to the fuel electrode for forming a fuel gas channel. A plurality of fuel cells are stacked one on another with a predetermined space therebetween for forming the oxygen-bearing gas channel or the fuel gas channel, within which an elastic electrically conductive and gas-porous member is provided for allowing electrical conduction as well as elasticity and gas permeability between the adjacently stacked fuel cells.

2. Description of the Related Art

In the fuel cell assembly of the above-described type, the elastic conductive member is interposed between adjacent cells, with the conductive member being placed in contact, on one side, with the flow-channel forming member of one of the adjacent cells and in contact, on the other side, with the oxygen or fuel electrode of the other cell, thereby to allow electrical conduction between the two cells. During an operation of the fuel cell assembly, there occurs a rise of temperature in the assembly which tends to cause heat distortion or warp of the cell assembly components. Then, the elastic conductive member, by its elasticity, serves to absorb such distortion or warp so as to maintain the good contact, i.e. electric conduction between this conductive member and the channel forming member as well as between the conductive member and the oxygen or fuel electrode. In short, the elastic conductive member functions to maintain good electric conduction between the adjacent cells.

However, with the temperature rise associated with the fuel cell assembly operation, the conductive member loses some of its elasticity. Accordingly, the contact condition between this conductive member and the channel forming member deteriorates to increase frictional resistance between the same. As a result, the electric conduction between the adjacent cells is impaired so that a high internal electric resistance develops within the fuel cell assembly, and such high internal electric resistance necessarily leads to disadvantageous reduction in the power output of the assembly.

The present invention attends to the above-described problem. Therefore, a primary object of this invention is to provide an improved fuel cell assembly and a method of producing the same, which assembly is constantly capable of large power output due to minimized internal electric resistance, the improvement being achieved through ingenious arrangement for the electrically conductive connection between adjacent cells.

SUMMARY OF THE INVENTION

For accomplishing the above-identified object, a fuel cell assembly, according to the present invention, comprises an electrically conductive film element interposed between the flow-channel forming member and the elastic conductive member, the conductive film element being conductively affixed to the flow-channel forming member and being fused to the elastic conductive member.

With the above-described construction of the present invention, the fused connection between the conductive film element and the elastic conductive member constantly assures maintenance of good physical contact, i.e. good electric conduction therebetween in spite of rise in the operation temperature of the fuel cell assembly. Also, the conductive affixation between the conductive film element and the flow-channel forming member constantly maintains the good electrical connection between the same in spite of the temperature rise by minimizing resistance therebetween.

Consequently, according to the assembly construction of the present invention, the conductive connection between adjacent cells may be maintained good invariably in spite of the temperature rise, whereby this assembly can provide a large output due to minimized internal resistance.

According to one aspect of the invention, the flow-channel forming member is formed of ceramics and is disposed in opposition to the oxygen electrode; and the conductive film element is conductively affixed to the entire surface of the elastic conductive member in a gas-tight manner for preventing gas passage.

In case the flow-channel forming member formed of ceramics is disposed in opposition to the oxygen electrode, this ceramic flow-channel forming member is exposed to a reducing atmosphere of the fuel gas passing through the elastic conductive member, such that oxygen atoms in the oxide tends to fall out to destroy the crystalline structure of the ceramics, thereby to cause conduction loss. According to the above-described construction, however, the conductive film element prevents such contact between the fuel gas and the flow-channel forming member. Thus, it is possible to avoid the conduction loss of the flow-channel forming member formed of ceramics.

As a result, when the flow-channel forming member is formed of ceramics and disposed in opposition to the oxygen electrode, the above-described construction of the invention can reduce the resistance between the elastic conductive member and the ceramic flow-channel forming member and can also avoid conduction loss of the flow-channel forming member. These serve to further reduce the internal resistance of the fuel cell assembly, so that the assembly provided with these further features can provide an even larger power output.

A method of producing a fuel cell assembly, according to the present invention, comprises the steps of:

attaching an oxygen electrode to one face of a solid electrolyte plate and attaching a fuel electrode to the other face of the solid electrolyte plate;

disposing an electrically conductive flow-channel member in opposition to the oxygen electrode or the fuel electrode to form an oxygen-bearing gas channel or a fuel gas channel, thereby to produce a fuel cell;

arranging a plurality of the fuel cells with a predetermined space therebetween to form the fuel gas channel or the oxygen-bearing gas channel;

interposing an elastic electrically conductive member having gas permeability between each adjacent pair of the fuel cells thereby to electrically connect the fuel cells;

forming an electrically conductive film element on a face of the flow-channel forming member facing the elastic conductive member; arid heat-fusing the conductive film element to the elastic conductive member.

According to a further method of the present invention, the method comprises the steps of:

applying, to the face of the flow-channel forming member facing the elastic conductive member, a paste material in the form of fine particles or containing metal substance in the form of fine particles; and heating the assembly to sinter the paste material to form the electrically conductive film element and also to fuse this conductive film element to the elastic conductive member.

This alternative method is advantageous in that the one time heating operation can effect the sintering of the paste material for the formation of the conductive film element as well as the fusing of this conductive film element to the elastic conductive member.

Further, the above-described heating operation can be done concurrently with initiation of operation of the fuel cell assembly by feeding the oxygen-bearing gas to the oxygen-bearing gas channels and feeding the fuel gas to the fuel gas channels of the assembly, which feeding causes rise in the temperature inside the assembly.

That is, with the initiation of the operation of the fuel cell assembly by supplying the oxygen-bearing gas into the oxygen-bearing gas channels and supplying simultaneously the fuel gas into the fuel gas channels, there occurs the temperature rise in this fuel cell assembly. Then, the heat from this temperature rise can be conveniently used for the sintering of the paste material for the formation of the conductive film member and also for the fusing of this conductive film member to the elastic conductive member.

Thus, this method can advantageously eliminate any special step for the heat application for the purposes of the formation of the conductive film element and of the fusing of the film element to the elastic conductive member.

Therefore, with this method, the fuel cell assembly can be produced in a more convenient and simple manner.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of a fuel cell assembly and a method of producing the same both relating to the present invention will be particularly described next with reference to the accompanying drawings.
(First Embodiment)

A first preferred embodiment will be described with reference to FIGS. 1 through 5.

Figure 2:
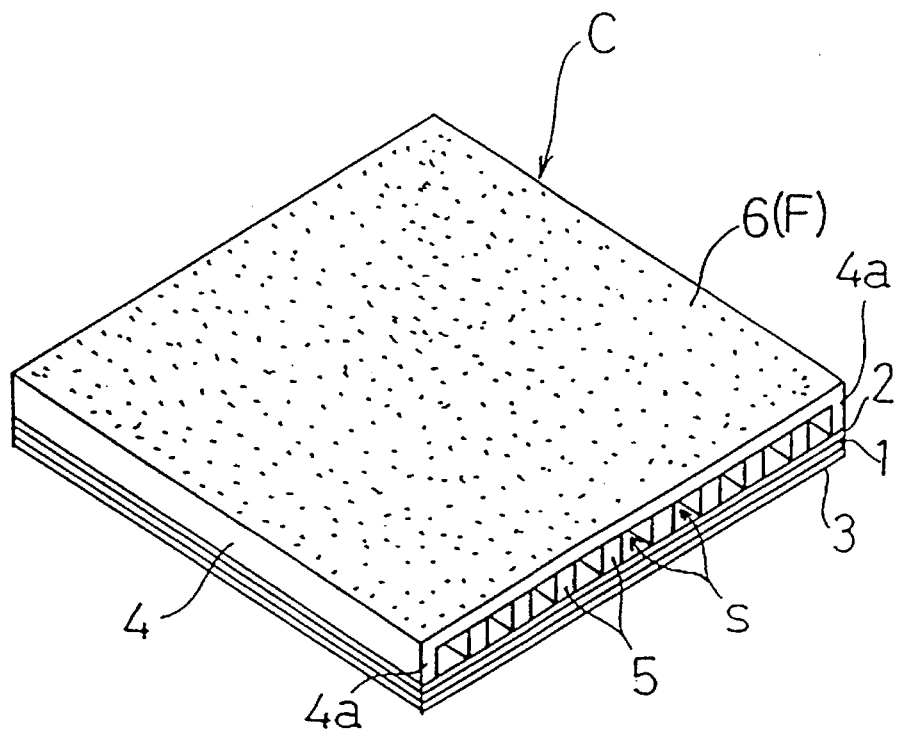
FIG. 2 is a perspective view of one of the fuel cells of the fuel cell assembly of FIG. 1.

First, the construction of a fuel cell C used in the fuel cell assembly will be described with reference to FIG. 2.

An oxygen electrode 2 in the form of a film or plate is attached to one face of a solid electrolyte plate 1 having a rectangular shape in the plane view. A fuel electrode 3 in the form of a film or plate is affixed to the entire or substantially entire other face of the solid electrolyte plate 1. Thus, these oxygen electrode 2, solid electrolyte plate 1 and fuel electrode 3 together form the three-layer fuel cell C, having the rectangular shape in the plane view, for obtaining electric power through the oxygen electrode 2 and the fuel electrode 3.

The solid electrolyte plate 1 is formed of an appropriate material such as a tetragonal system of $ZrO_2$ containing solution of Yt at about 3 mol %. The oxygen electrode 2 is formed of an appropriate material such as $LaMnO_3$. Also, the fuel electrode 3 is formed of such material as cermet of Ni and $ZrO_2$.

An electrically conductive separator 4 including an opposed pair of ridge portions 4a is affixed, through the entire lengths of the ridge portions 4a, to the oxygen electrode 2 of the above-described three-layer construction. This completes the fuel cell C having an oxygen-bearing gas channel (s) formed between the oxygen electrode 2 and the conductive separator 4 and a fuel gas channel (f) formed by the periphery of the separator 4 and the the periphery of the three-layer construction as viewed from the extending direction of the oxygen-bearing gas channel (s) and separated from the oxygen-bearing gas channel (s). In this way, the conductive separator 4 functions as a flow-channel forming member to be disposed for forming the oxygen-bearing gas channel (s) facing the oxygen electrode 2.

The conductive separator 4 is formed of an electrically conductive ceramic material having good resistance against oxidation and reduction such as $LaCrO_3$.

Within the oxygen-bearing gas channel (s), there are provided a plurality of conductive members 5 disposed parallel to and with substantially the same distance therebetween, with the conductive members 5 being placed in contact with the oxygen electrode 2 and the conductive separator 4. In this manner, the conductive members 5 serve to increase the area of contact for electric conduction between the oxygen electrode 2 and the conductive separator 4 acting as a cell terminal.

These conductive members 5 are formed of an electrically conductive material having good resistance against oxidation and reduction such as $LaCrO_3$.

On the entire face (excluding the side faces) of the conductive separator 4 facing the fuel gas channel (f), there is formed a nickel oxide film 6 acting as a film element F for forming an electrically conductive film element M to be detailed later. The formation of this nickel oxide film 6 will be specifically described next.

A particle material of NiO (i.e. nickel oxide) and a powder material of ceramics are mixed together with an organic resin, organic solvent or the like to obtain a pasty mixture material. Then, this pasty mixture material is applied onto the surface of the conductive separator 4 by means of e.g. the screen printing. Thereafter, heat is applied to this separator 4 in an oxidizing atmosphere thereby to sinter the NiO particles and the ceramics powder, so that the nickel oxide film 6 affixed to the conductive separator 4 is obtained. The nickel oxide film 6 in this condition is a porous film having numerous minute pores. Also because this film is made of NiO, the film has a high resistivity.

Figure 1:
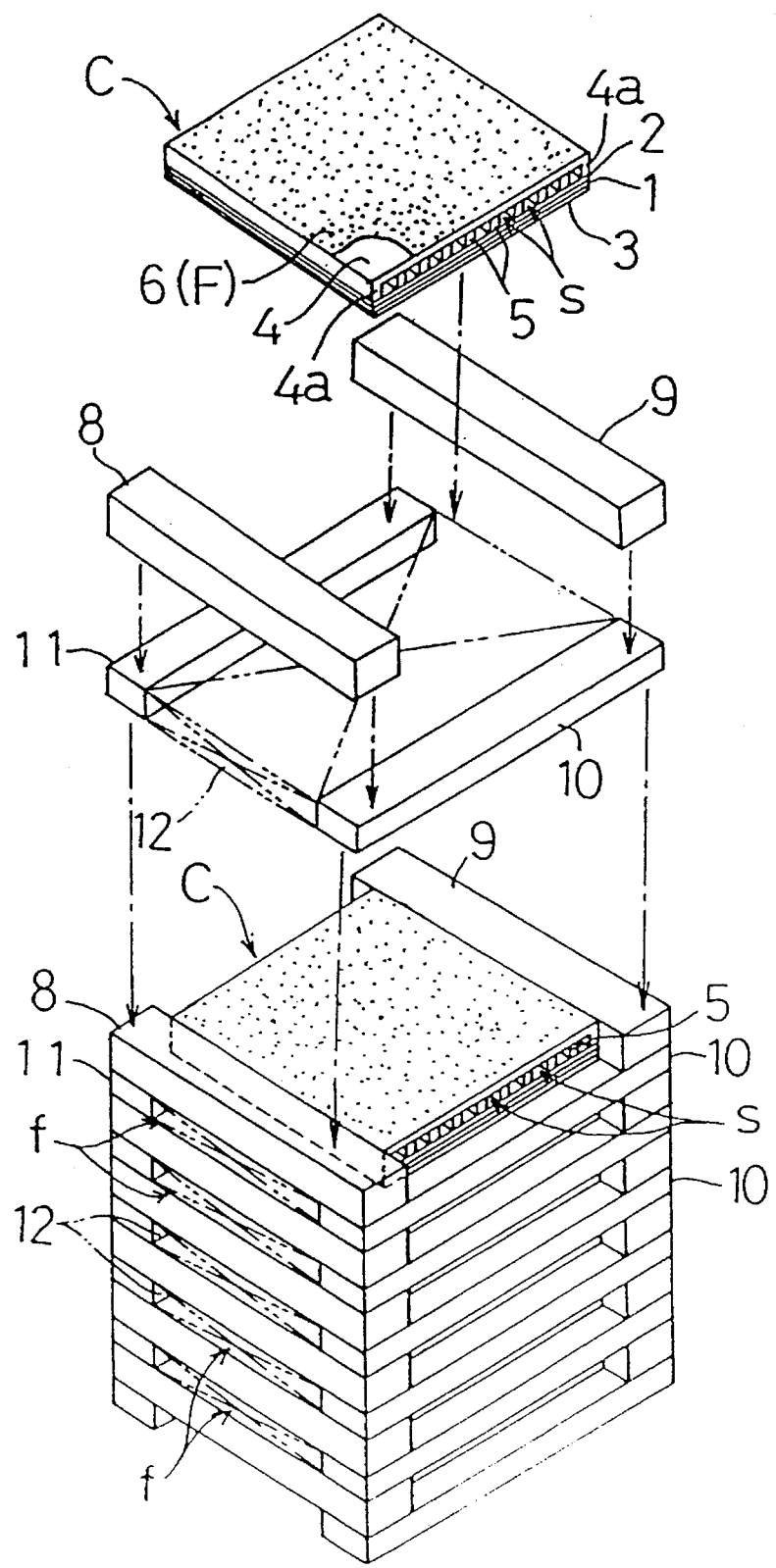
FIG. 1 is an exploded perspective view showing a fuel cell assembly according to a first preferred embodiment of the present invention.

Next, with reference to FIG. 1, there will be described an arrangement of a plurality of fuel cells each having the above-described construction disposed in juxtaposition to each other with a predetermined distance therebetween for forming the fuel gas channel (f).

A first band member 8 and a second band member 9 each having a same thickness as and a greater length than the fuel cell C are respectively placed in contact with each of a pair of opposing side faces of the fuel cell C where the oxygen-bearing gas channel (s) is closed by the conductive separator 4. Further, third and fourth band members 10, 11 are placed in contact with a pair of edge portions of the cell C on the side where the oxygen-bearing gas channel (s) is opened. Also, the opposed ends of the first and second band members 8, 9 are placed in contact with opposed ends of the third and fourth band members 10, 11. Then, on these third and fourth band members 10, 11, a further cell C and further first and second band members 8, 9 are placed. These operations are repeated in the above-described manner.

A space formed between each adjacent pair of fuel cells C, C, there is filled with an elastic conductive member 12 so formed as to provide gas-permeable and elastic properties. With this, the space between the adjacent cells C, C is formed as the fuel gas channel (f) having its opposed sides partitioned by the third and fourth band members 10, 11. That is, the nickel oxide film 6 is formed on the entire face of the conductive separator 4 facing the elastic conductive member 12.

The elastic conductive member 12 is formed of any appropriate material having good resistance against heat and reduction such as a felt-like material of Ni or the like.

Figure 4:
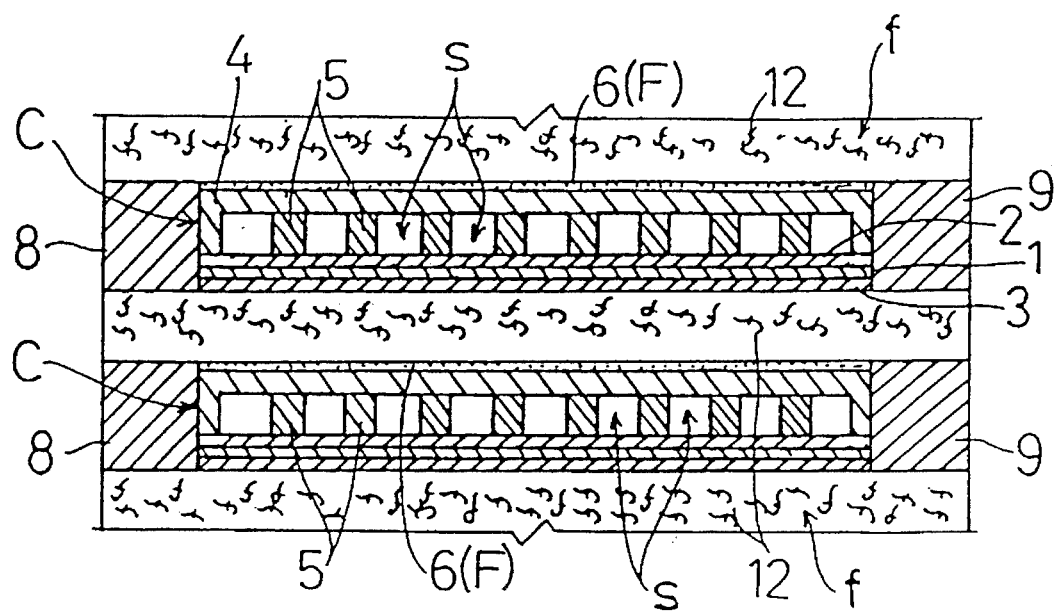
FIG. 4 is a vertical section of the fuel cell assembly of FIG. 1.

Incidentally, in the above-described condition, as shown in FIG. 4, the elastic conductive member 12 is placed in contact with the fuel electrode 3 of one of the adjacent cells C and the nickel oxide film 6 formed on the surface of the conductive separator 4 of the other cell C.

In operation of the fuel cell assembly having the above-described construction, the oxygen-bearing gas such as air is fed to the respective oxygen-bearing gas channels (s) and the reducing fuel gas such as hydrogen gas is fed to the respective fuel gas channels (f), thereby to start the operation of this fuel cell assembly. In due course, the temperature inside the assembly rises approximately to 1,000 degrees in Celsius.

With this rise of temperature, the nickel oxide film 6 is heated within the oxidizing atmosphere. So that, NiO of the nickel oxide film 6 is reduced to Ni and, as illustrated in FIG. 5, the nickel oxide film 6 is rendered into a nickel film 6a made of Ni having a lower resistivity and also this nickel film 6a and the elastic conductive member 12 become fused to each other.

Accordingly, the nickel film 6a and the conductive separator 4 are conductively affixed to each other and also the nickel film 6a and the elastic conductive member 12 are conductively fused to each other, whereby the adjacent cells C, C are conductively joined to each other through the elastic conductive member 12. The nickel film 6a constitutes an electrically conductive film element M.

Figure 5:
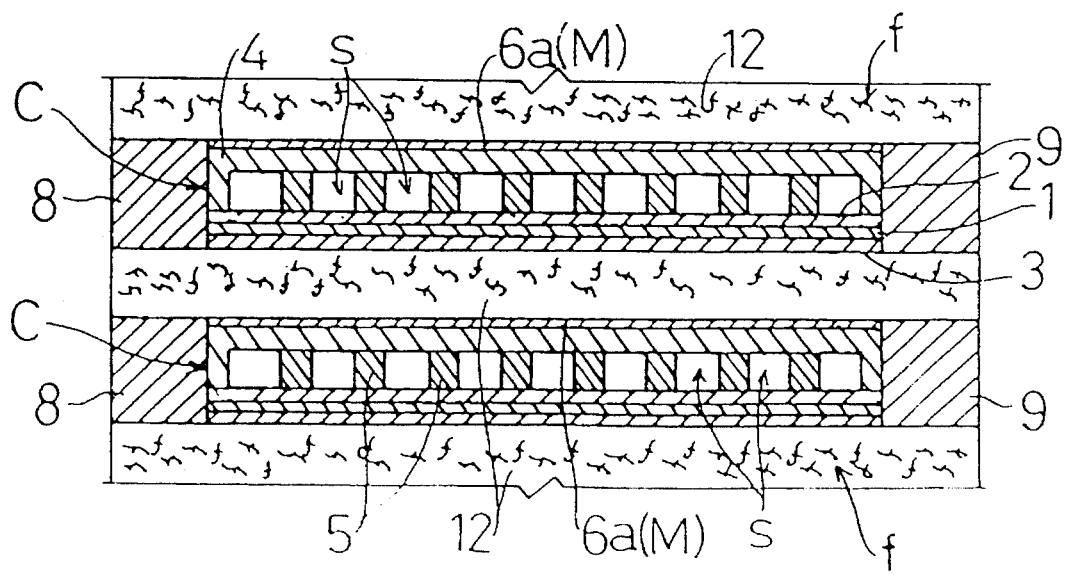
FIG. 5 is a vertical section showing the electrically conductive film element and an elastic conductive member, in a mutually fused state, of the fuel cell assembly of FIG. 1.

In FIGS. 4 and 5, the nickel oxide film 6, nickel film 6a and the elastic conductive member 12 are shown in a schematic manner in terms of the thicknesses, shapes or the like thereof for the purpose of facilitating understanding from these drawings.

Figure 3:
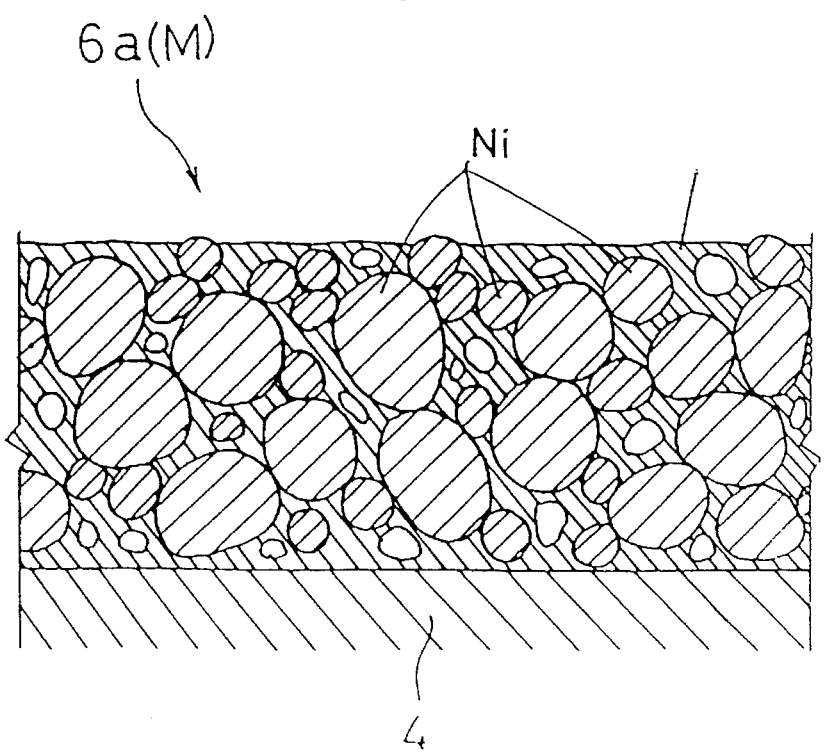
FIG. 3 is a view showing an enlarged section of an electrically conductive film element of the fuel cell assembly of FIG. 1.

FIG. 3 shows a thickness-wise section of the nickel film 6a enlarged through an electron microscope. As shown, in the nickel film 6a, metal particles of Ni are held within the ceramic system. According to this structure, the ceramics of the conductor separator 4 and the ceramics of the nickel film 6a are bonded to each other to provide a strong bonding between the separator 4 and the nickel film 6a. Moreover, the ceramics content of the nickel film 6a serves to prevent bonding between the metal particles of the film 6a. Thus, this nickel film 6a has good durability.

(Second Embodiment)

A second preferred embodiment of the present invention will be described next with reference to FIGS. 6 through 9.

Figure 7:
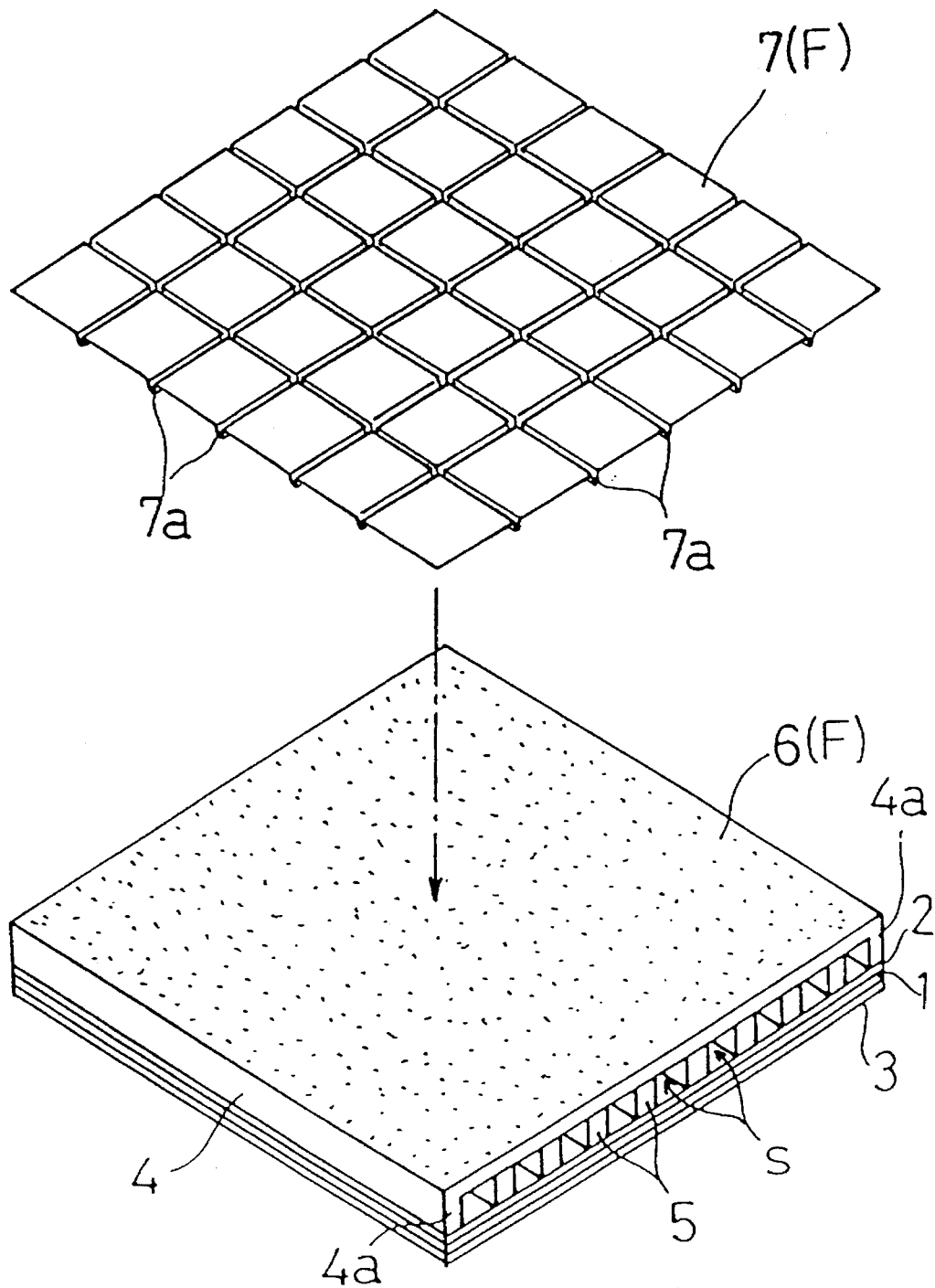
FIG. 7 is a perspective view showing one of the fuel cells of the fuel cell assembly of FIG. 6.

As shown in FIG. 7, the fuel cell C is constructed in the same manner as the first embodiment. Then, on the entire face, facing the fuel gas channel (f) (excluding the side faces) of the conductive separator 4 of the fuel cell C, there is formed the nickel oxide film 6 in the same manner as the first embodiment. Further, on the entire face of this nickel oxide film 6, there is affixed a nickel foil 7. This nickel foil 7 has a plurality of crepes 7a equi-distantly arranged in the grating-like pattern.

That is, in this embodiment, the nickel oxide film 6 and the nickel foil 7 together form the conductive film element M.

Figure 6:
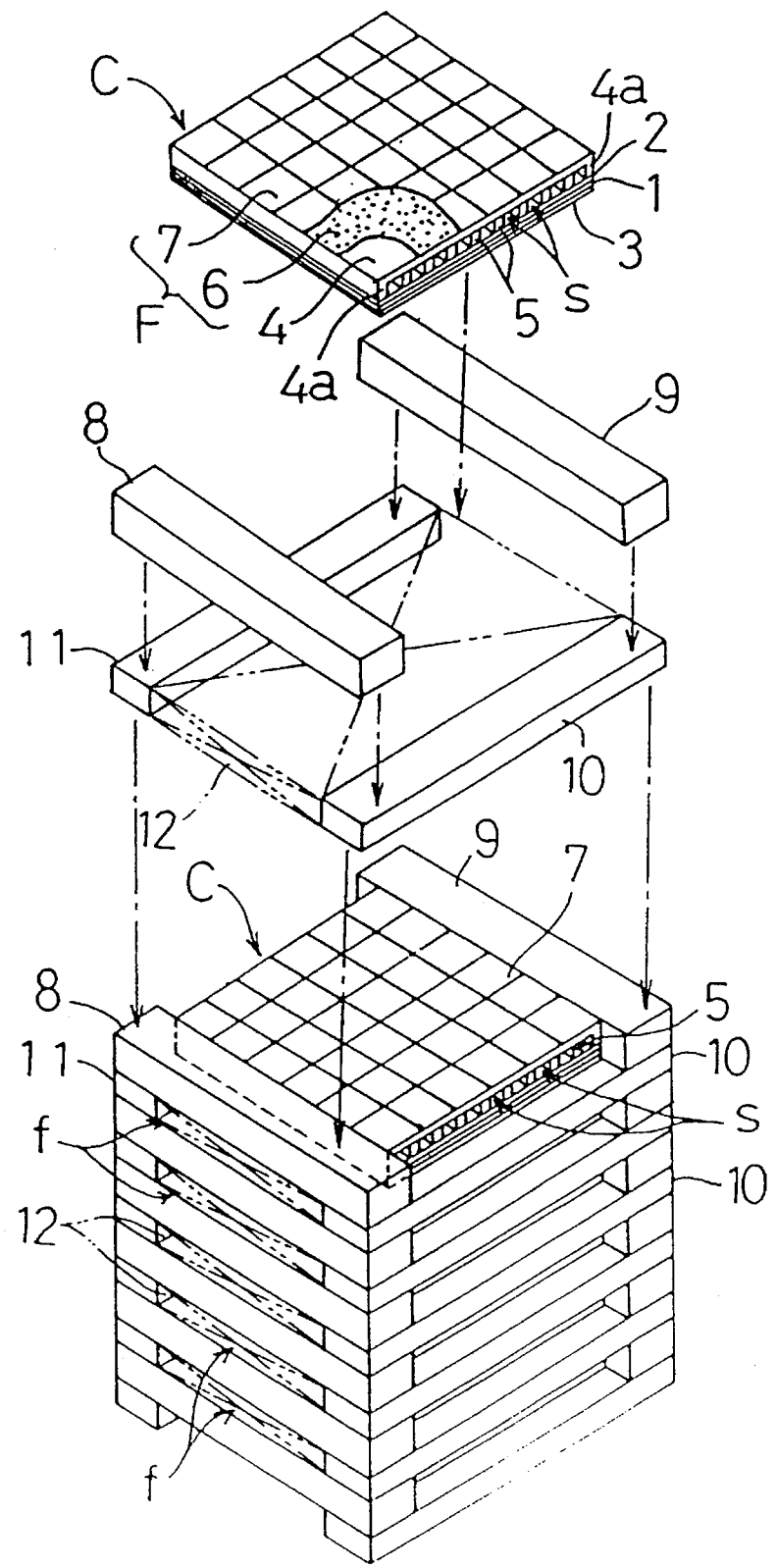
FIG. 6 is an exploded perspective view showing a fuel cell assembly of a second preferred embodiment of the present invention.

Then, as illustrated in FIG. 6, a plurality of the fuel cells C each having the above-described construction are assembled in juxtaposition with a predetermined distance therebetween for forming the fuel gas channels (f), with each space between the adjacent cells C, C being filled with the elastic conductive member 12, in the same manner as the first embodiment.

Figure 8:
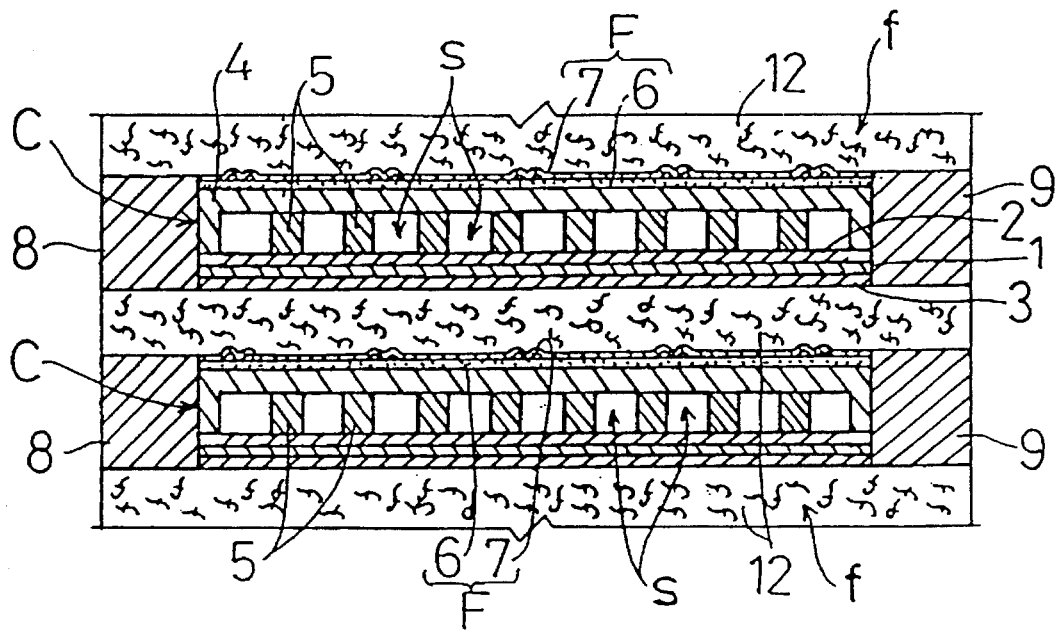
FIG. 8 is a vertical section of the fuel cell assembly of FIG. 6.

In this condition, as shown in FIG. 8, the elastic conductive member 12 is placed in contact with the fuel electrode 3 of one of the adjacent cells C, C and in contact also with the nickel foil 7 of the film element M formed on the surface of the conductive separator 4 of the other cell C.

Figure 9:
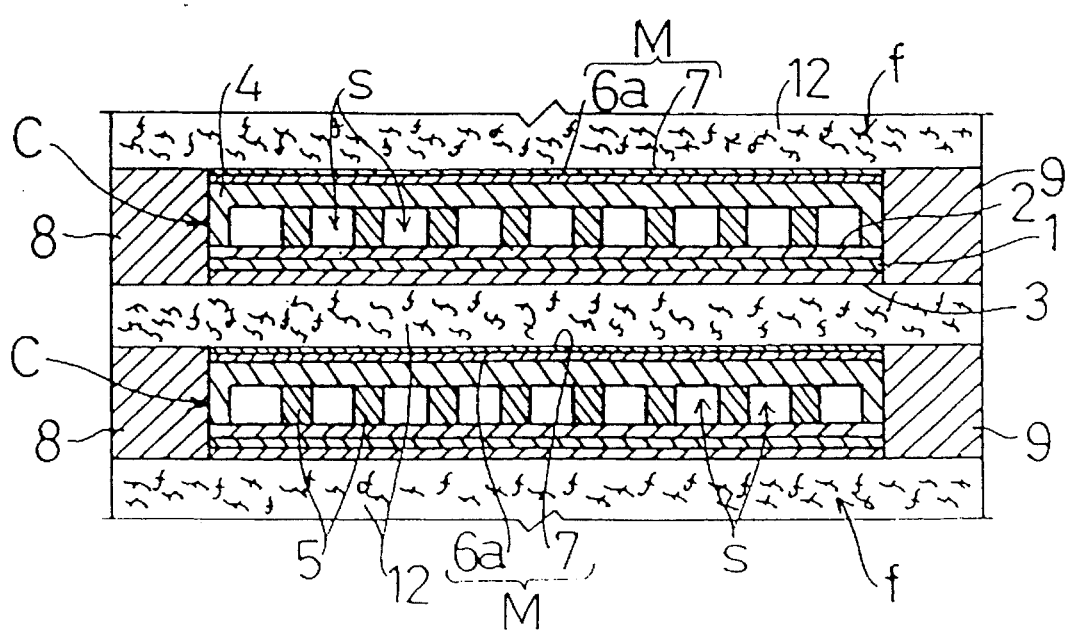
FIG. 9 is a vertical section showing the electrically conductive film and the elastic conductive element, in a mutually fused state, of the fuel cell assembly of FIG. 6.

Then, like the first embodiment, as this fuel cell assembly starts its operation, the temperature inside the assembly rises thereby to heat the nickel oxide film 6 and the nickel foil 7 in the reducing atmosphere. With this, as illustrated in FIG. 9, a nickel film 6 is formed and the nickel film 6 and the nickel foil 7 are bonded together to form an integral film. Also, the nickel foil 7 becomes fused to the elastic conductive member 12. In the course of the above, the crepes 7a of the nickel foil 7 function to compensate for thermal expansion difference between the conductive separator 4 and the nickel foil 7, thereby to prevent breakage of the nickel foil 7.

In this conductive film element M comprising the integral assembly of the nickel film 6 and the nickel foil 7, the nickel foil 7 functions to prevent passage of gas through this element M.

In FIGS. 8 and 9, the nickel oxide film 6, nickel film 6a, nickel foil 7 and the elastic conductive member 12 are shown in a schematic manner in terms of the thicknesses, shapes or the like thereof for the purpose of facilitating understanding from these drawings.

(Third Embodiment)

A third preferred embodiment of the present invention will be described next with reference to FIGS. 10 through 13.

Figure 11:
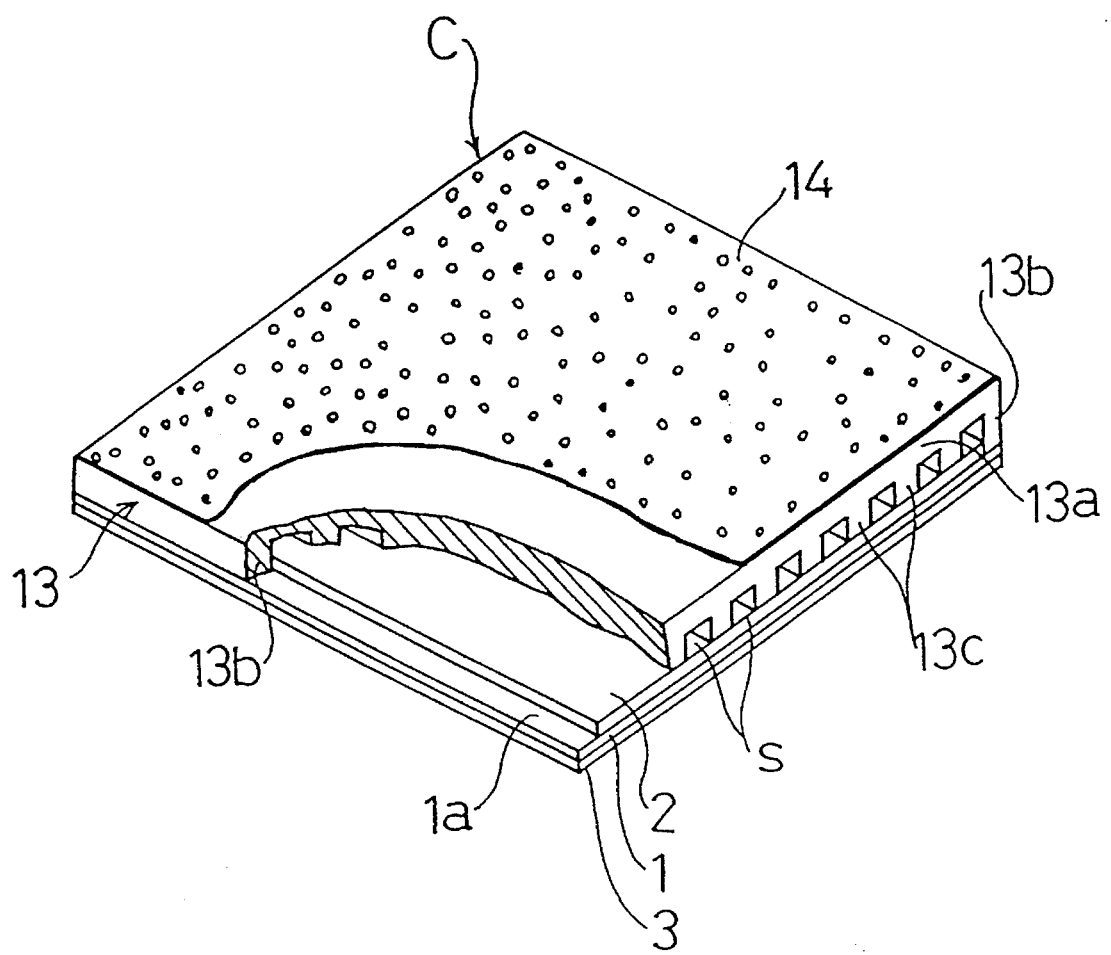
FIG. 11 is a perspective view showing one of the fuel cells of the fuel cell assembly of FIG. 10.

First, the construction of a fuel cell C will be described with reference to FIG. 11.

An oxygen electrode 2 in the form of a film or a plate is integrally affixed to one face of a solid electrolyte plate 1 having a rectangular shape in the plane view, with electrolyte-exposed portions 1a being formed along the entire lengths of opposed side edges of the solid electrolyte plate 1. On the other face of the solid electrolyte plate 1, there is integrally affixed a fuel electrode 3 in the form of a film or a plate. This completes a three-layer fuel cell C having the rectangular shape in the plane view and for obtaining the source power through the oxygen electrode 2 and the fuel electrode 3.

A conductive separator 13 integrally includes a plate portion 13a, a pair of ridge portions 13b located on opposed ends of the plate portion 13a and a plurality of band projections 13c located between the ridge portions 13b. And, the pair of ridge portions 13b are affixed respectively to the electrolyte-exposed portions 1a, with the respective band projections 13c being placed in contact with the oxygen electrode 2. This completes the fuel cell C having the rectangular shape in the plane view and having the oxygen-bearing gas channel (s) formed between the oxygen electrode 2 and the conductive separator 13 and the fuel gas channel (f) formed by the periphery of the separator 4 and the the periphery of the three-layer construction as viewed from the extending direction of the oxygen-bearing gas channel (s) and separated from this oxygen-bearing gas channel (s).

Therefore, the conductive separator 13 functions as the flow-channel forming member to be disposed for forming the oxygen-bearing gas channel (s) facing the oxygen electrode 2.

The solid electrolyte plate 1, oxygen electrode 2, fuel electrode 3 and the conductive separator 13 are formed of the same materials forming the respective equivalents of the first embodiment.

The entire face (excluding the side faces) of the conductive separator 13 facing the fuel electrode 3 is applied, through e.g. the screen printing, with a pasty material comprising mixture of Ni particles and an organic resin or organic solvent or the like, thereby to form a film coating 14. Incidentally, the film coating 14 is heated at temperatures ranging between 100 and 150 degrees in Celsius to be dried with evaporation of the organic solvent contained in the pasty material. The film coating 14 in this condition has been subjected only to the evaporation treatment of the organic solvent present in the pasty material, so that this film coating 14 is only weakly bonded to the conductive separator and has an electrically insulating property.

Figure 10:
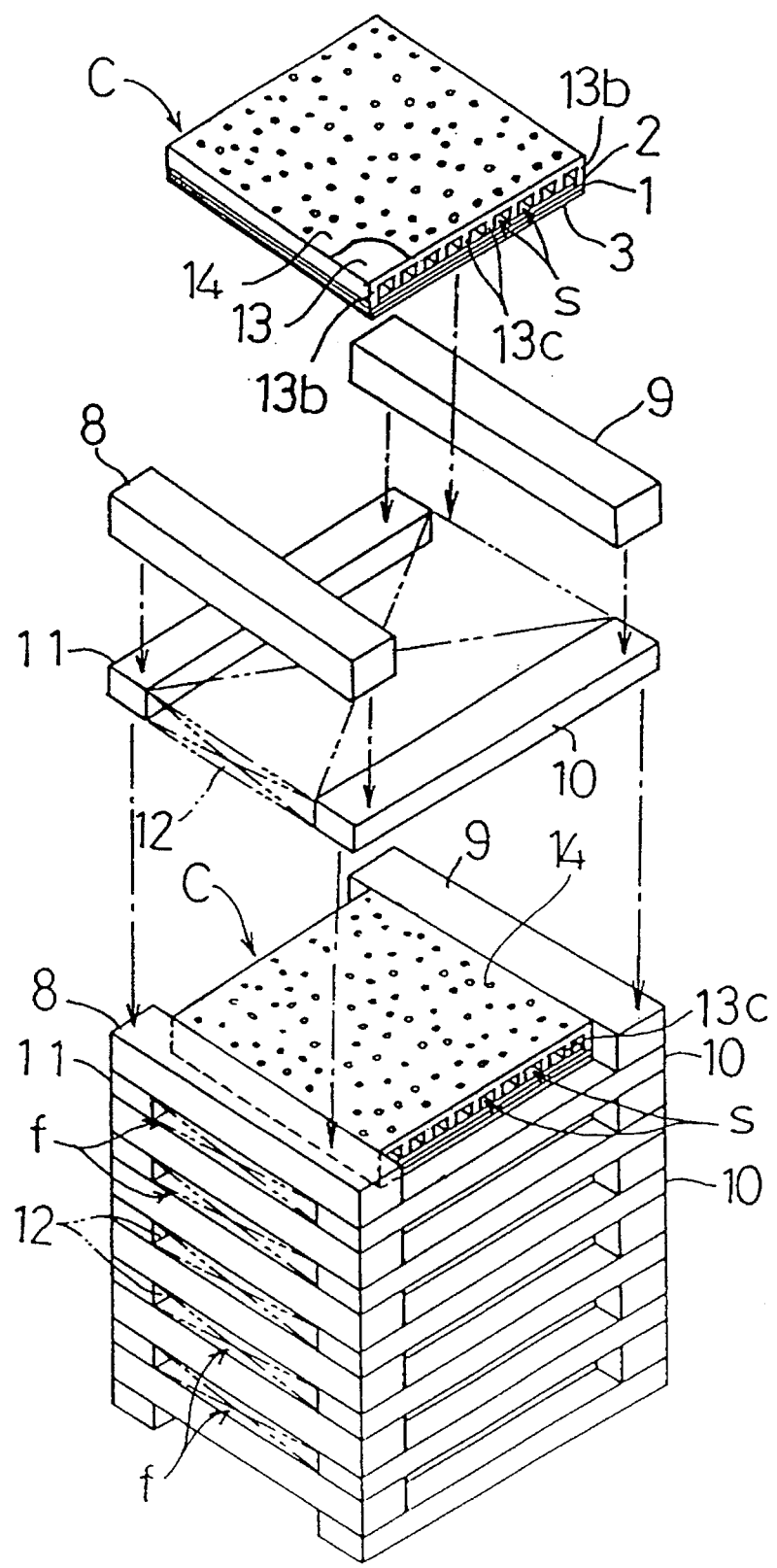
FIG. 10 is an exploded perspective view showing a fuel cell assembly according to a third embodiment of the present invention.

Then, as illustrated in FIG. 10, a plurality of the fuel cells C each having the above-described construction are assembled in juxtaposition with a predetermined distance therebetween for forming the fuel gas channels (f), with each space between the adjacent cells C, C being filled with the elastic conductive member 12, in the same manner as the first embodiment.

Figure 12:
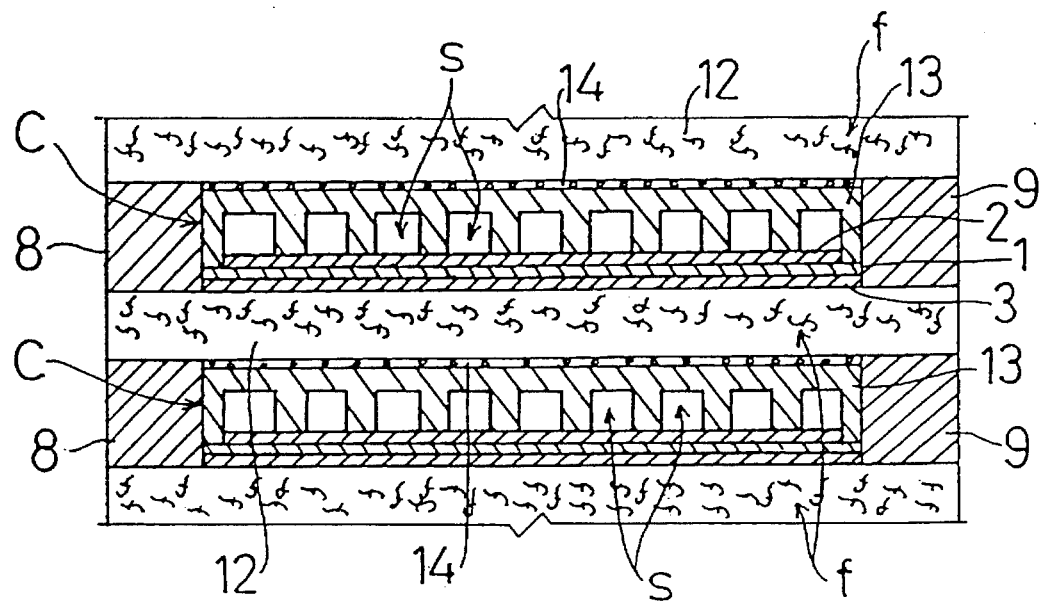
FIG. 12 is a vertical section of the fuel cell assembly of FIG. 10.

Incidentally, in the above-described condition, as shown in FIG. 12, the elastic conductive member 12 is placed in contact with the fuel electrode 3 of one of the adjacent cells C and the film coating 14 formed on the surface of the conductive separator 13 of the other cell C.

Figure 13:
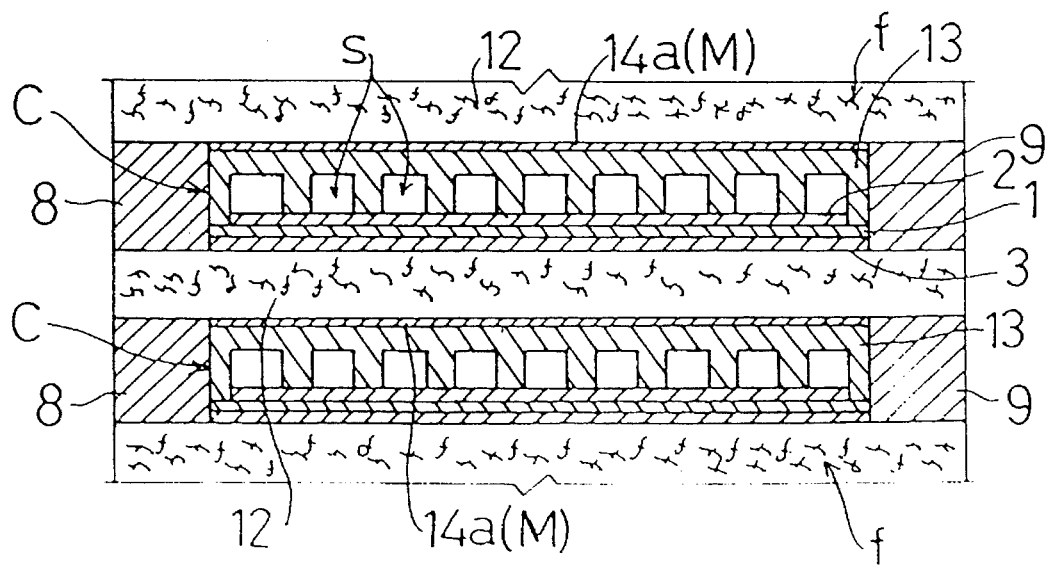
FIG. 13 is a vertical section showing the electrically conductive film and the elastic conductive element, in a mutually fused state, of the fuel cell assembly of FIG. 10.

Then, like the first embodiment, as this fuel cell assembly starts its operation, the temperature inside the assembly rises to heat the film coating 14 in the reducing atmosphere, thereby to sinter the pasty material and the Ni particles therein. With this, as shown in FIG. 13, there is obtained the nickel film 14a conductively affixed to the conductive separator 13 and also fused to the elastic conductive member 12. Thus, in this embodiment, the nickel film 14a comprises the electrically conductive film element M.

In FIGS. 12 and 13, the film coating 14, nickel film 14a and the elastic conductive member 12 are shown in a schematic manner in terms of the thicknesses, shapes or the like thereof for the purpose of facilitating understanding from these drawings.

Next some other embodiments of the present invention will be specifically described.

(1) In the first and second embodiments, the heating for the formation of the electrically conductive film element M and for the fusing of the conductive film element M to the elastic conductive member 12 is effected by utilizing the temperature rise associated with the initiation of the operation of the fuel cell assembly. Instead, this heating operation may be effected by pre-heating the fuel cell assembly under the oxidizing or reducing atmosphere prior to the initiation of the operation of this fuel cell assembly.

(2) In the third embodiment, the heating operation for the sintering of the pasty material and for the fusing of the conductive film element M to the elastic conductive member 12 is effected by utilizing the temperature rise associated with the initiation of the operation of the fuel cell assembly. Instead, this heating operation may be effected by pre-heating the fuel cell assembly under the oxidizing or reducing atmosphere prior to the initiation of the operation of this fuel cell assembly.

(3) In the first and second embodiments, the kind of the pasty material is not limited those disclosed therein, but may be formed of any other appropriate material. For instance, in place of the NiO particles, NiO powder in the form of flakes, Ni particles or Ni powder in the form of flakes may be employed. Further, as the ceramics powder, insulating ceramics powder such as alumina or the same conductive ceramics powder of $LaCrO_3$ as used for the conductive separator 4 may be employed. Further alternatively, the invention may be practiced without using any ceramics powder at all.

(4) In the first embodiment, the film element M is formed by applying the pasty material and then sintering the same under the oxidizing atmosphere. The film element M may be formed in any other convenient manner. For instance, such conventional film forming methods as CVD or evaporation or the well-known thermal spraying method may be utilized. In the cases of these methods too, the film element M may be formed in the non-gas-porous manner capable of preventing gas passage therethrough.

(5) The kind of metal forming the conductive film element M is not limited to Ni disclosed in the foregoing embodiments. Instead, any other metal such as Pt or Pt alloy having good resistance against heat and reduction may be employed.

(6) In the first and second embodiments, the conductive members 5 on the side of the oxygen electrode are equidistantly juxtaposed in parallel to each other and in contact with the oxygen electrode 2 and the conductive separator 4. Alternatively, it is conceivable to form the conductive separator 4 and the conductive members 5 integrally of each other by forming a plurality of grooves acting as the oxygen-bearing gas channels (s) in equidistantly parallel to each other in a conductive ceramics member having a rectangular shape.

(7) The conductive film element M may be produced in the same manner as in the third embodiment by using the fuel cell C having the construction disclosed in the first embodiment. Likewise, the conductive film element M may be produced in the same manner as in the first or second embodiments by using the fuel cell C having the construction disclosed in the third embodiment.

(8) In the foregoing embodiments, the conductive separator 4 or 13 is disposed in opposition to the oxygen electrode 2, such that the oxygen-bearing gas channel (s) is formed between the oxygen electrode 2 and the separator 4 or 13 while the fuel gas channel (f) separated from the oxygen-bearing gas channel (s) as viewed from the flowing direction of the channel (s) is formed by the periphery of the separator 4 or 13 and that of the three-layer construction. Conversely, the conductive separator 4 or 13 may be disposed in opposition to the fuel electrode 3, such that the fuel gas passage (f) is formed between the fuel electrode 3 and the separator 4 or 13 while the oxygen-bearing gas channel (s) separated from the fuel gas channel (f) as viewed from the flowing direction of this channel (f) is formed by the periphery of the separator 4 or 13 and that of the three-layer construction. In this case, between adjacent cells C, the oxygen-bearing gas channel (s) is formed. Thus, the metal material used for forming the conductive film element M should have good resistance against heat and oxidation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. A fuel cell comprising:

a solid electrolyte plate;

an oxygen electrode attached on one side of said solid electrolyte plate;

a fuel electrode attached on the other side of said solid electrolyte plate;

an electrically conductive flow-channel forming member disposed in opposition to said oxygen electrode for forming an oxygen-bearing gas channel;

a fuel gas channel formed between said fuel electrode and said electrically conductive flow-channel forming member;

an elastic electrically conductive member disposed in said fuel gas channel for allowing an electrically conductive connection between said fuel electrode and said electrically conductive flow-channel forming member, said elastic electrically conductive member having a gas permeability; and an electrically conductive film element interposed between said electrically conductive flow-channel forming member and said elastic electrically conductive member for binding the two members in such way to allow an electrically conductive connection between them.

2. The fuel cell as described in claim 1 wherein said electrically conductive film element being formed by reducing a metallic oxide contained in a paste coated in advance on said electrically conductive flow-channel forming member by heating said fuel cell.

3. The fuel cell as described in claim 2, wherein said electrically conductive film element being fused to said elastic electrically conductive member by said heating of said fuel cell.

4. The fuel cell as described in claim 3, wherein said metallic oxide is a nickel oxide.

5. The fuel cell as described in claim 4, wherein said paste includes a ceramic powder which can be sintered with said nickel oxide by said heating of said fuel cell.

6. The fuel cell as described in claim 2 wherein said electrically conductive flow-channel forming member includes a ceramic component, and wherein said paste includes a ceramic powder which can bind with said ceramic component of said electrically conductive flow-channel forming member along said heating of said fuel cell.

7. The fuel cell as described in claim 1, said electrically conductive film element includes a nickel foil.

8. The fuel cell as described in claim 7, said nickel foil further comprises a plurality of crepes equidistantly arranged in a grate-like pattern.

9. A fuel cell comprising:

a solid electrolyte plate;

an oxygen electrode attached on one side of said solid electrolyte plate;

a fuel electrode attached on the other side of said solid electrolyte plate;

an electrically conductive flow-channel forming member disposed in opposition to said oxygen electrode for forming an oxygen-bearing gas channel;

a fuel gas channel formed between said fuel electrode and said electrically conductive flow-channel forming member.

an elastic electrically conductive member disposed in said fuel gas channel for allowing an electrically conductive connection between said fuel electrode and said electrically conductive flow-channel forming member, said elastic electrically conductive member having a gas permeability; and a film element coated on said electrically conductive flow-channel forming member, said film element being capable of obtaining a raised electrical conductivity by heating and said film element, after having a raised electrical conductivity, binding said electrically conductive flow-channel forming member with said elastic electrically conductive member to allow an electrically conductive connection between them.

10. A fuel cell comprising:

a solid electrolyte plate;

an oxygen electrode attached on one side of said solid electrolyte plate;

a fuel electrode attached on the other side of said solid electrolyte plate;

an electrically conductive flow-channel forming member disposed in opposition to said fuel electrode for forming a fuel gas channel;

an oxygen-bearing gas channel formed between said oxygen electrode and said electrically conductive flow-channel forming member;

an elastic electrically conductive member disposed in said oxygen-bearing gas channel for allowing an electrically conductive connection between said oxygen electrode and said electrically conductive flow-channel forming member, said elastic electrically conductive member having a gas permeability; and an electrically conductive film element interposed between said electrically conductive flow-channel forming member and said elastic electrically conductive member for binding the two members in such way to allow an electrically conductive connection between them.

11. The fuel cell as described in claim 10 wherein said electrically conductive film element being formed by reducing a metallic oxide contained in a paste coated in advance on said electrically conductive flow-channel forming member by heating said fuel cell.

12. The fuel cell as described in claim 11 wherein said electrically conductive film element being fused to said elastic electrically conductive member by said heating of said fuel cell.

13. The fuel cell as described in claim 12, wherein said metallic oxide is a nickel oxide.

14. The fuel cell as described in claim 13, wherein said paste includes a ceramic powder which can be sintered with said nickel oxide by heating of said fuel cell.

15. The fuel cell as described in claim 11, wherein said electrically conductive flow-channel forming member includes a ceramic component, and wherein said paste includes a ceramic powder which can bind with said ceramic component of said electrically conductive flow-channel forming member along said heating of said fuel cell.

16. The fuel cell as described in claim 10, wherein said electrically conductive film element includes a nickel foil.

17. The fuel cell as described in claim 16 wherein said nickel foil has a plurality of crepes equidistantly arranged in a grate-like pattern.

18. A fuel cell comprising:

a solid electrolyte plate;

an oxygen electrode attached on one said of said solid electrolyte plate;

a fuel electrode attached on the other side of said solid electrolyte plate;

an electrically conductive flow-channel forming member disposed in opposition to said fuel electrode for forming a fuel gas channel;

an oxygen-bearing gas channel formed between said oxygen electrode and said electrically conductive flow-channel forming member;

an elastic electrically conductive member disposed in said oxygen-bearing gas channel for allowing an electrically conductive connection between said oxygen electrode and said electrically conductive flow-channel forming member, said elastic electrically conductive member having a gas permeability; and a film element coated on said electrically conductive flow-channel forming member, said film element being capable of obtaining a raised electrical conductivity by heating, and said film element after having a raised electrical conductivity binds said electrically conductive flow-channel forming member with said elastic electrically conductive member to allow an electrically conductive connection between them.

* * * * *